United States Patent [19]

Steinberger et al.

[11] Patent Number: 4,473,233
[45] Date of Patent: Sep. 25, 1984

[54] POWER-ACTUATED CHUCK

[75] Inventors: Josef Steinberger, Düsseldorf; Heinrich Beckers, Viersen, both of Fed. Rep. of Germany

[73] Assignee: Paul Forkardt GmbH & Co. KG, Düsseldorf, Fed. Rep. of Germany

[21] Appl. No.: 349,547

[22] Filed: Feb. 17, 1982

[30] Foreign Application Priority Data

Mar. 7, 1981 [DE] Fed. Rep. of Germany ....... 3108745

[51] Int. Cl.³ ............................................. B23B 31/16
[52] U.S. Cl. .................................. 279/121; 279/1 H; 279/1 K
[58] Field of Search ............... 279/121, 123, 122, 110, 279/71, 72, 1 H, 1 K; 408/710

[56] References Cited

U.S. PATENT DOCUMENTS 1,533,875 4/1925 McCleary ............................ 279/71
1,874,888 5/1930 Burrell ................................ 279/1 H
4,007,943 2/1977 Scharfen et al. .................... 279/121

Primary Examiner—Z. R. Bilinsky
Assistant Examiner—Thomas Kline
Attorney, Agent, or Firm—Martin A. Farber

[57] ABSTRACT

The present invention relates to a power-actuated chuck having a plurality of clamping jaws which are radially guided in a chuck body and are connected, via wedge receivers which extend at an angle to the axis of the chuck and wedge pieces extending into said wedge receivers, to an adjustment member which is axially displaceable in the chuck body and whose operating stroke is limited by form-locking and can be lengthened by turning a ring mounted coaxial to the chuck axis in the chuck body in order to disengage the clamping jaws from the adjustment member. In order to be able to disengage the clamping jaws from the adjustment member by an additional stroke of the latter without additional transmission elements being necessary for this, the ring is developed as a synchronizing ring (6) for controlling at least two stop pins (7) which are mounted in the chuck body (1) and are displaceable into the path of movement of the adjustment member as stops limiting the operating stroke (A) of the adjustment member (4).

14 Claims, 4 Drawing Figures

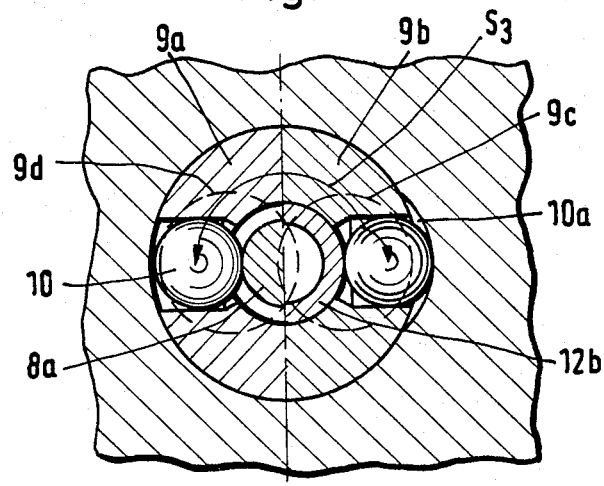
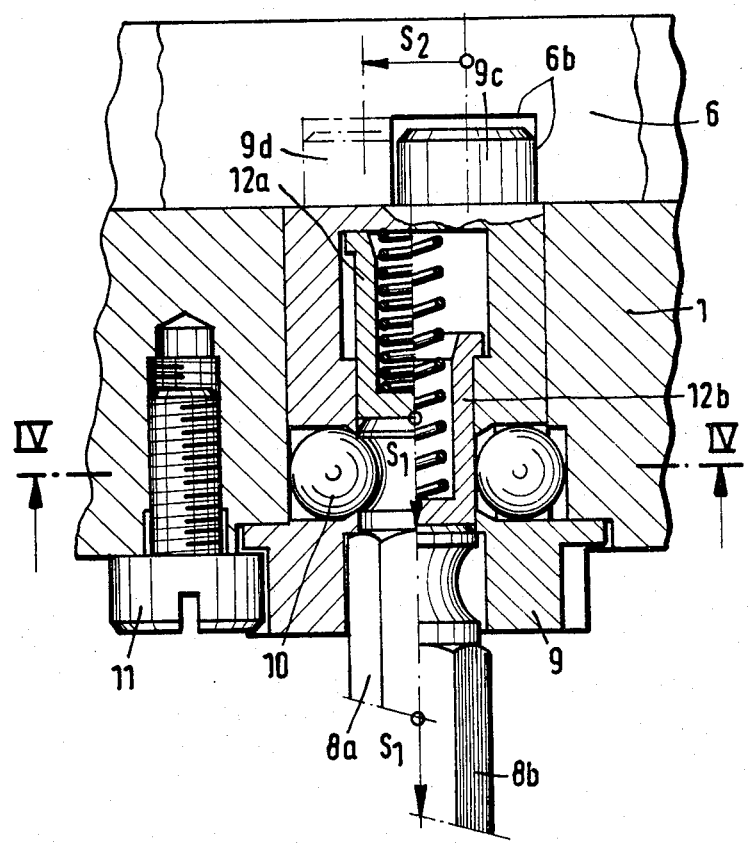

POWER-ACTUATED CHUCK

The present invention relates to a power-actuated clamping having a plurality of chuck jaws which are guided radially in a chuck body and are connected, via wedge receivers extending at an inclination to the axis of the chuck and wedge pieces engaging into said wedge receivers, to an adjustment member which is guided for axial displacement in the chuck body, the operating stroke of which adjustment member is limited by a form lock and can be lengthened by turning a ring supported in the chuck body coaxial to the axis of the clamping in order to disengage the chuck jaws from the adjustment member.

Power-actuated chucks of the type described above are already known. They have the advantage that the clamping jaws are disengaged from the adjustment member by an additional stroke after a given turn of the ring by hand, preferably by a key which can be introduced into the chuck from the front, and that the clamping jaws can accordingly be removed radially from the body of the chuck in order to be replaced by other clamping jaws which are adapted to the new machining task.

In order to be able to lengthen the rearward operating path of the chuck, which is limited on both sides by abutment stops, i.e. by a form lock, so as to disengage the clamping jaws from the adjustment member, the ring turnably supported in the chuck body is provided in one known embodiment of the power-actuated chuck of the above-described type with recesses. Wedge bars, which are supported for rotation in the chuck body parallel to the axis of rotation of the chuck and are arranged in each case as transmission elements between a clamping jaw and the adjustment member, can enter into these recesses in the one end position of the ring which serves for unlocking of the clamping jaws. In the other end position of the ring these wedge bars strike against the front end surface of the ring so that the ring at the same time serves as an abutment stop. The use of this known construction is therefore limited to chucks which have transmission elements supported for axial displacement in the chuck body between the adjustment member and the clamping jaws.

The object of the present invention is to create a power-actuated chuck of the aforementioned type whose clamping jaws, which are connected via wedge receivers extending at an angle to the axis of the chuck and wedge pieces engaging into said receivers, can be disconnected from the adjustment member by an additional stroke of the latter without additional transmission elements being required for this, so that in addition to a simplification in construction the possibility exists to use same on standard chucks with key mechanisms.

The attainment of this object by the invention is characterized by the fact that the ring is developed as a synchronous ring for controlling at least two stop pins or bolts which are mounted in the chuck body and can be displaced in the path of movement of the adjustment member as an abutment limiting the operating stroke of the adjustment member.

By the development in accordance with the invention there is obtained a power-actuated chuck whose operating stroke is limited by these stop pins which enter directly into the path of movement of the adjustment member and can be intentionally pulled back in order to disengage the clamping jaws from the adjustment member respectively. In this way there is obtained a construction for the form-lock limitation of the operating stroke which is independent of the formation of the transmission mechanism between the adjustment member and the clamping jaws and, in addition to high reliability in operation, also is of low structural expense and can be used even in known chuck constructions since both the stop pins and the synchronizing ring connecting them together take up only a small amount of space and, due to their functional separation from the drive of the clamping jaws, can be arranged in those parts of the chuck body which do not already have to be machined for other structural parts of the chuck. For this reason it is possible to retrofit existing chucks in accordance with the invention in order to adapt them to increased safety requirements. In accordance with another feature of the invention, the stop pins are preferably arranged for radial displacement in the body of the chuck. The number of them preferably corresponds to the number of clamping jaws, since they are arranged in the chuck body in the space existing between the individual clamping jaws.

In order to obtain a positive control of the stop pins by the synchronizing ring without the use of springs and their susceptibility to failure, the stop pins are coupled with the synchronizing ring in accordance with the invention by means of form-lock control cams. In one preferred embodiment, the control cams are formed within a rear recess of each stop bolt and on front ledges of the synchronizing ring which ring is mounted directly behind the stop pins in the chuck body.

If, in accordance with another feature of the invention, the length of the stop pins is made to correspond approximately to the length of their guides which are formed in the chuck body, then the radially outer ends of the stop pins protrude from the circumferential surface of the chuck body so as to be easily recognized visually when they are in a position such that the adjustment member is able to carry out its additional stroke for disengagement from the clamping jaws. In addition to visual recognition of this condition of uncoupling it is, of course, possible to electrically or mechanically "feel" or sense the stop pins extending out of the chuck body inevitably or in order in positive manner, to prevent rotation of the chuck body when the clamping jaws are disengaged.

By the invention it is finally proposed that the synchronous ring be turned between its two end positions in known manner per se by a hand key which can be introduced into the chuck body from the front and which can be withdrawn solely in that position of the synchronizing ring in which the stop pins are advanced into the path of movement of the adjustment member. Furthermore, the invention proposes a device which at the same time provides assurance that the key is ejected in the properly coupled position and therefore it does not erroneously remain inserted. In the disengaged position the key cannot be withdrawn. This provides the operator with a further indication that the adjustment member is in the position which disengages it from the clamping jaws and in which the drive of the chuck must not be connected.

With the above and other objects and advantages in view, the present invention will become more clearly understood in connection with the detailed description of a preferred embodiment, when considered with the accompanying drawing, of which:

FIG. 3 is another partial section along the section line III—III of FIG. 2, and FIG. 4 is a section along the section line IV—IV of FIG. 3.

Figure 1:
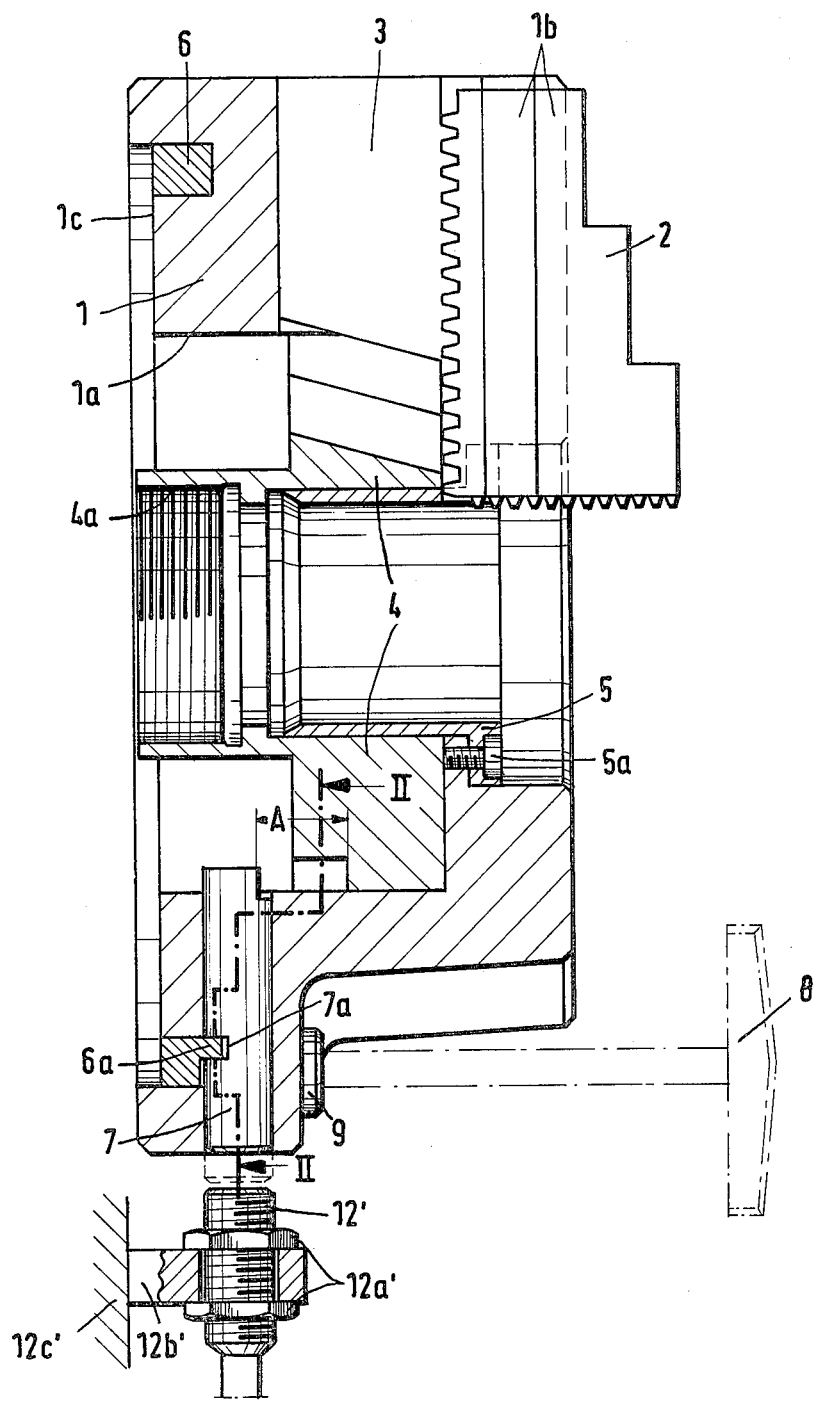
FIG. 1 is a longitudinal section through the chuck.
Figure 2:
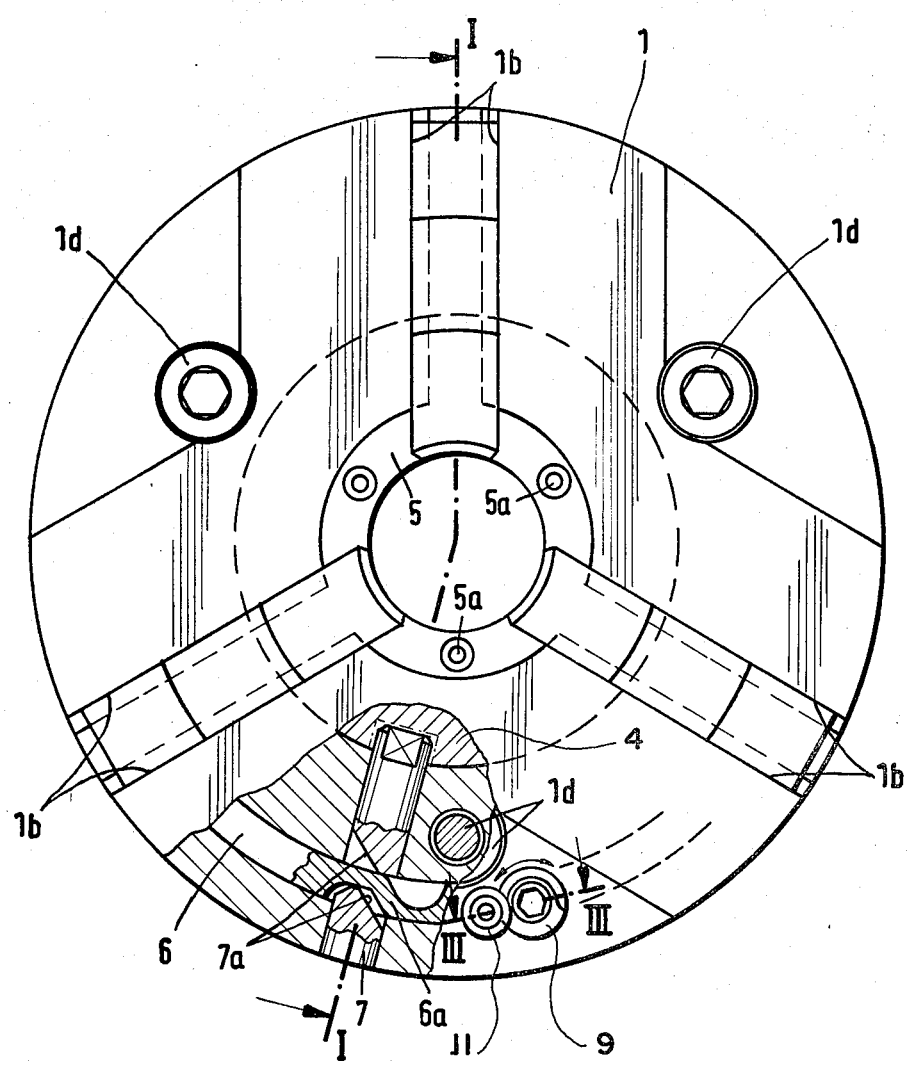
FIG. 2 is a front view of the chuck with a partial section along the section line II—II of FIG. 1.

The power-actuated chuck, the longitudinal section of which in FIG. 1 is taken along the section line I—I in FIG. 2, has a chuck body 1 which has three axial holes 1a for chuck fastening screws 1d by which the chuck is fastened to a spindle of a machine tool. The chuck shown by way of example is a jaw chuck with three clamping jaws 2 so that the chuck body 1 has three radial guides 1b. Each of the clamping jaws 2 is driven by a separate drive jaw 3 which engages via wedge pieces extending at an angle to the axis of the chuck in wedge receivers of an adjustment member 4 which also extend at an angle to the axis of the chuck. This adjustment member 4 is axially displaceable in the chuck body 1 and upon its axial displacement produces radial movement of the drive jaws 3 and thus of the clamping jaws 2 connected with said drive jaws in the radial guides 1b of the chuck body 1. In order to be able to fasten the adjustment member 4 to a draw or connecting rod, not shown in the drawing, it is provided with a thread 4a.

The chuck shown by way of example is developed as a hollow chuck so that the workpieces to be clamped can be fed to the clamping jaws 2 through the hollow spindle from the rear of the machine tool. In order to guide these workpieces and avoid damage to the adjustment member 4, the central bore of the latter is covered by a guide sleeve 5 which is fastened by screws 5a to the chuck body 1.

In the rear part of the chuck body 1 there is turnably mounted a synchronizing ring 6 which is fixed axially in position when the chuck body 1 of the chuck has been fastened to the flange of a spindle, not shown. The abutment surface 1c provided for the resting of the chuck body 1 against the spindle can be noted from FIG. 1.

The synchronizing ring 6 serves for the simultaneous control of three stop pins 7 which, in the embodiment shown by way of example, are arranged for radial displacement in the chuck body 1. Each stop pin 7 is provided with a recess 7a to its rear, the development of which can best be noted from FIG. 2. Into this recess 7a there extends in each case a ledge or rail 6a which is formed on the front side of the synchronizing ring 6 and is shown in front view also in FIG. 2. The ledge 6a and recess 7a together form a cam which effects a form-lock coupling of the stop pins 7 to the synchronizing ring 6 so that the radial displacement of the stop pins 7 is effected inevitably in positive manner upon the turning of the synchronizing ring 6.

FIG. 1 shows the operating stroke A of the adjustment member 4 which is limited in the direction towards the front of the chuck by the adjustment member 4 abutting against the chuck body 1 and in the opposite direction by the adjustment member 4 abutting against the stop pins 7 which have been displaced into its path of movement. In the position of the synchronizing ring 6 shown in FIGS. 1 and 2 the adjustment member 4 can therefore be displaced only within its operating stroke A; within this operating stroke A, reliable engagement of the drive jaws 3 into the adjustment member 4 is assured.

On the other hand, when the synchronizing ring 6 is turned in clockwise direction from the position shown in FIGS. 1 and 2, the stop pins 7 are pulled radially outwardly into the position shown in dash-dot line. In this position, the inner ends of the stop pins 7 are outside the path of movement of the adjustment member 4 so that the latter can be pulled back to such an extent by its power actuation that the wedge pieces of the drive jaws 3 emerge from the wedge receivers of the adjustment member 4. In this way it is possible to remove the drive jaws 3 together with the clamping jaws 2 out of the radial guides 1b of the chuck body 1 in order either to displace the clamping jaws 2 relative to the three drive jaws 3 or replace them by other clamping jaws 2 before the drive jaws 3 together with the clamping jaws 2 are again inserted into the chuck body 1. When the adjustment member 4 is then moved axially in the direction towards the front of the chuck body 1, the wedge pieces of the drive jaws 3 again move into the wedge receivers of the adjustment member 4 so that the clamping jaws 2 are again moved in radial direction if the adjustment member 4 is displaced axially within its operating stroke A. In order that unintended disengagement of the drive jaws 3 from the adjustment member 4 cannot take place, after the drive jaws 3 and clamping jaws 2 have been inserted and the adjustment member 4 has been brought back into the operating path A the synchronizing ring 6 is again turned into the position shown in FIGS. 1 and 2. In this position the stop pins 7 which extend into the path of movement of the adjustment member 4 prevent unintended disengagement between the drive jaws 3 and the adjustment member 4.

The turning of the synchronizing ring 6 between its two possible end positions is effected, in the embodiment shown, by a hand key 8, indicated in dot-dash line in FIG. 1, which can be inserted from the front into a key receiver 9. This key receiver 9, shown in detail in FIGS. 3 and 4, extends by an eccentric extension 9c into a corresponding groove 6b of the synchronizing ring 6. The path of swing is limited and the key receiver 9 is held in the chuck body 1 by a screw 11 which partially covers the key receiver 9. A detent element 10, for instance a ball, makes certain that the hand key 8 can only be inserted into the key receiver 9 or withdrawn from it when the synchronizing ring 6 and thus the stop pins 7 are in the locked position, that is their radially inwardly displaced position, for coupling the adjustment member 4 with the drive jaws 3 via the wedge receivers and wedge pieces and thus operatively with the clamping jaws. After locking by swinging the key receiver 9 through the angle $S_3$ from the position 9a into the position 9b, the ball 10 can extend into a free space 10a formed as a recess in the chuck body 1, and it releases the key 8 which is then pushed out over the path $S_1$ by a spring bushing 12b while the machine is still stationary.

In FIGS. 3 and 4, the locked position of the hand key 8 bearing the reference number 8a and the pushed-out position of the hand key 8 bearing the reference number 8b are shown. Similarly, the spring bushing has been given the reference number 12a when the key is locked and the reference number 12b when the key is released. When the key 8 is locked, the key receiver 9 also bears the reference number 9a, and when the key is released it bears the reference number 9b. The number 9c indicates an extension whose swung position bears the reference number 9d. Finally, $S_1$ is the axial path of the hand key 8 or spring bushing 12a, 12b, $S_2$ the path of swing of the extension 9c, and $S_3$ the angle of swing of the key receiver 9. FIGS. 3 and 4 show the hand key 8 and the key receiver 9 respectively in the locked position in the left-hand half and in the unlocked position in the right-hand half.

As shown by the dot-dash position of the stop pins 7 in FIGS. 1 and 2, they extend visibly out of the circumferential surface of the chuck body 1 when the front ends of the stop pins 7 have been moved out of the path of movement of the adjustment member 4. The stop pins 7, whose length corresponds approximately to the length of their guide channels in the chuck body 1, thus visibly show that the operating stroke A of the adjustment member 4 can be increased for the disengagement of the drive jaws 3 from the adjustment member 4. The stop pins 7 which extend out of the chuck body 1 can, if necessary, be "sensed" electrically or mechanically in order to prevent rotary driving of the chuck position shown in dot-dash lines. In FIG. 1 there is shown a path sensor 12' which is fastened by two nuts 12a' to a support part 12b' which is arranged fixed on a part 12c' of the machine tool. By means of this path sensor 12' it can be verified whether the stop pins 7 are in their active position within the chuck body 1 or in their disengaged position in which rotation of the chuck must be prevented.

We claim:

1. In a power-actuated chuck having a plurality of clamping jaws, a chuck body for radially guiding said clamping jaws, wedge receivers extending inclined to the chuck axis and wedge pieces engaging into said wedge receivers, an adjustment member being guided for axial displacement in the chuck body, the adjustment member being operatively connected to said clamping jaws via said wedge receivers and said wedge pieces, a limit means for limiting the operating stroke of the adjustment member, and a turnable ring mounted in the chuck body coaxial to the axis of the chuck body to permit lengthening of the operating stroke of the adjustment member via the limit means in order to disengage the clamping jaws from operative connection to the adjustment member, the improvement wherein said limit means constitutes at least two stop pins mounted in the chuck body displaceably into a path of movement of said adjustment member constituting stop means for limiting the operating stroke of the adjustment member, and said ring is a synchronizing ring constituting means for synchronously controlling said at least two stop pins.

2. The chuck according to claim 1, wherein
said stop pins and said synchronizing ring define cooperating cam means operatively coupling said stop pins with said synchronizing ring.

3. The chuck according to claim 2, wherein
said cam means are formed within a recess formed in each of said stop pins and on projections constituting ledges of the synchronizing ring, the latter being mounted directly adjacent said stop pins in the chuck body.

4. The chuck according to claim 1, wherein
said chuck body is formed with radially oriented guides,
said stop pins are radially displaceably mounted within said chuck body in said radially oriented guides.

5. The chuck according to claim 1, wherein
said chuck body is formed with guide means for the displaceable mounting of said at least two stop pins, the length of said stop pins corresponds approximately to the length of said guide means.

6. The chuck according to claim 1, further comprising
hand key means for operatively turning said synchronizing ring between two end positions thereof,
said hand key means is operatively insertable from a front of said chuck body into said chuck body,
key withdrawal means cooperating with said hand key means for enabling said hand key means to be withdrawn from said chuck body exclusively in a position of said synchronizing ring in which said stop pins have been advanced into the path of movement of said adjustment member.

7. The chuck according to claim 6, further comprising
said key withdrawal means comprising a key receiver means for receiving said hand key means inserted into said body chuck body and for automatically ejecting said hand key means from said key receiver means in a position of the stop pins coupling the clamping jaws operatively with the adjustment member via said wedge receivers and said wedge pieces constituting the position of said synchronizing ring in which said stop pins have been advanced into the path of movement of said adjustment member.

8. The chuck according to claim 7, further comprising
spring bushing means, constituting part of said key receiver means, for said automatically ejecting of said hand key means.

9. The chuck according to claim 7, wherein
said key receiver means is operatively connected with said synchronizing ring and with said hand key means for movement of the key receiver means so as to turn said synchronizing ring when said hand key means is actuated.

10. The chuck according to claim 1 or 5, further comprising
means for sensing a position of said stop pins extending out of said chuck body.

11. The chuck according to claim 7, wherein
said key receiver means includes detent means for preventing withdrawal of said hand key means from said key receiver means in all other positions of said stop pins and of said synchronizing ring.

12. The chuck according to claim 11, wherein
said chuck body is formed with a recess in which said key receiver means is rotatably mounted,
said key receiver means is operatively connected to said synchronizing ring so as to turn said synchronizing ring when said key receiver means is rotated,
said detent means of said key receiver means comprises a ball having a spherical surface, said hand key means having a portion formed with an outer annular groove partially complementary, in axial cross-section through said hand key means, to said spherical surface of said ball and matingly engaging said spherical surface of said ball when said hand key means is inserted in said chuck body and received in said key receiver means,
said recess formed in said chuck body has a recess portion, said recess portion has a first portion with a free space and having a transverse dimension extending from a surface of said key receiver means substantially equal to the diameter of said ball and respectively from the outer annular groove of said hand key means substantially greater than the diameter of said ball, said recess portion has a second portion having a transverse dimension extending from said annular groove of said hand key means substantially equal to the diameter of said ball, said first portion of said recess portion corresponds to said position of said stop pins and of said synchronizing ring and said second portion of said recess portion corresponds to said other positions of said stop pins and of said synchronizing ring, said key receiver means is formed with a radial recess coinciding with said recess portion and movable therealong upon rotation of said key receiver means, said ball is mounted in said radial recess, said hand key means is for rotating said key receiver means and moving said ball from said first portion of said recess portion to said second portion of said recess portion and respectively back into said first portion.

13. The chuck according to claim 12, further comprising spring bushing means, constituting part of said key receiver means, for said automatically ejecting of said hand key means, said spring bushing means is inwardly axially displaceable against spring biasing away from said radial recess by a front of said hand key means when said hand key means is inserted in said chuck body and received in said key receiver means and defines said surface of said key receiver means at said radial recess and said recess portion when said hand key means is withdrawn from said key receiver means.

14. The chuck according to claim 2, wherein said synchronizing ring has a ledge on a front thereof toward a free end of the chuck body, said stop pins are mounted in the chuck body directly in front of said synchronizing ring, each of said stop pins is formed with a recess in a rear thereof, said ledge extends into said recesses of said stop pins, and said cam means are formed within said recesses and on said ledge.

* * * * *